United States Patent
Vromans

(10) Patent No.: US 7,221,640 B2
(45) Date of Patent: May 22, 2007

(54) METHOD OF MANUFACTURING AN OPTICAL STORAGE MEDIUM AND OPTICAL STORAGE MEDIUM

(75) Inventor: Petrus Helena Gerardus Maria Vromans, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 371 days.

(21) Appl. No.: 10/514,589

(22) PCT Filed: May 13, 2003

(86) PCT No.: PCT/IB03/01961

§ 371 (c)(1),
(2), (4) Date: Nov. 16, 2004

(87) PCT Pub. No.: WO03/098607

PCT Pub. Date: Nov. 27, 2003

(65) Prior Publication Data

US 2006/0164961 A1 Jul. 27, 2006

(30) Foreign Application Priority Data

May 21, 2002 (EP) .................................. 02076983

(51) Int. Cl.
*G11B 4/24* (2006.01)

(52) U.S. Cl. .................... 369/275.1; 369/288; 369/280; 428/64.4

(58) Field of Classification Search ............ 369/275.1, 369/275.2, 275.3, 275.4, 275.5, 272.1, 288, 369/283, 280, 277; 428/64.4, 64.1, 64.5; 349/96, 193; 359/443, 449

See application file for complete search history.

(56) References Cited

U.S. PATENT DOCUMENTS

2006/0059501 A1* 3/2006 Vromans et al. ............ 720/718

FOREIGN PATENT DOCUMENTS

| JP | 60182534 A | 9/1985 |
| JP | 02010539 | 1/1990 |
| JP | 06004910 A | 1/1994 |
| JP | 10074342 A | 3/1998 |

* cited by examiner

*Primary Examiner*—Ali Neyzari

(57) ABSTRACT

A method of manufacturing an optical storage medium is provided, which comprises at least a transparent spacer layer (22) or transparent cover layer. This layer is provided by spincoating a liquid layer (22) between an inner radius ri and outer radius ro and substantial solidification by means of exposure to e.g. UV-radiation. The solidification of the liquid (22) is started at ri at a moment in time defined as t=ti. The solidification of the liquid (22) at ro takes place at a moment in time defined as t=to and to=ti+d and d>1 s. The solidification of the liquid (22) between ri and ro takes place at a moment in time between ti and to. The advantage is that the radial thickness uniformity of the solidified liquid (22) is substantially improved and better than $+/-\mu m$. Further an optical storage medium is provided manufactured using the method wherein additionally a stamper, preferably transparent to radiation, is pressed into an unsolidified top portion of the liquid layer (22) and solidified using a special device. In this way information is provided into the spacer layer (22) without disturbing the thickness uniformity of the spacer layer (22).

12 Claims, 2 Drawing Sheets

METHOD OF MANUFACTURING AN OPTICAL STORAGE MEDIUM AND OPTICAL STORAGE MEDIUM

The invention relates to a method of manufacturing an optical storage medium, comprising a substrate and a plurality of layers deposited on the substrate, including at least one of a transparent spacer layer and transparent cover layer, which layer is provided by applying a liquid onto the rotating substrate and rotating the substrate further in order to spread out the liquid into a layer substantially uniformly between an inner radius $r_i$ and an outer radius $r_o$, and substantially solidifying the liquid layer by means of exposure to radiation.

The invention further relates to an optical storage medium manufactured using said method.

An embodiment of such a method is known from European patent application EP-A-1047055. In particular the application of a light transmissive adhesive layer in order to bond cover layers or other layers to each other, to the surface of a substrate and/or to one or more information storage layers is described.

There is a constant drive for obtaining optical storage media suitable for recording and reproducing, which have a storage capacity of 8 Gigabyte (GB) or larger. This requirement is met by some Digital Video Disk or sometimes also Digital Versatile Disk formats (DVD). DVD formats can be divided into DVD-ROM that is exclusively for reproduction, DVD-RAM, DVD–RW and DVD+RW, which are also usable for rewritable data storage, and DVD-R, which is recordable once. Presently the DVD formats comprise disks with capacities of 4.7 GB, 8.5 GB, 9.4 GB and 17 GB.

The 8.5 GB and, in particular, the 9.4 GB (DVD-9) and 17 GB (DVD-18) formats exhibit more complicated constructions and usually comprise multiple information storage layers. The 4.7 GB single layer re-writable DVD format is easy to handle comparable, for example, to a conventional compact disk (CD) but offers an insufficient storage capacity for video recording purposes.

A high storage capacity format that recently has been suggested is Digital Video Recordable disk (DVR). Two formats are currently being developed: DVR-red and DVR-blue, the latter also called Blu-Ray Disk (BD), where red and blue refer to the used radiation beam wavelength for recording and reading. This disk overcomes the capacity problem and, in its simplest form, has a single storage layer format which is suitable for high density digital video recording and storage having a capacity up to 22 GB in the DVR-blue format.

The DVR disk generally comprises a disk-shaped substrate exhibiting on one or both surfaces an information storage layer. The DVR disk further comprises one or more radiation beam transmissive layers. These layers are transmissive to the radiation beam that is used to read from or write into the disk. For example a transmissive cover layer, which is applied on the information storage layer. Generally, for high-density disks, lenses with high numerical aperture (NA), e.g. higher than 0.60, are used for focusing such a radiation beam with a relatively low wavelength. For systems with NA's above 0.60 it becomes increasingly difficult to apply substrate incident recording with substrate thicknesses in the 0.6–1.2 mm range due to decreasing tolerances on e.g. thickness variations and disk tilt. For this reason, when using disks that are recorded and read out with a high NA, focusing onto a recording layer of a first recording stack, is performed from the side opposite from the substrate. Because the first recording layer has to be protected from the environment at least one relatively thin radiation beam transmissive cover layer, e.g. thinner than 0.5 mm, is used through which the radiation beam is focused. Clearly the need for the substrate to be radiation beam transmissive no longer exists and other substrate materials, e.g. metals or alloys thereof, may be used.

In case second or further recording stacks are present, a radiation beam transmissive spacer layer is required between the recording stacks. The second and further recording stacks must be at least partially transparent to the radiation beam wavelength in order to making writing in and reading from the recording layer of the first recording stack possible. The thickness of such spacer layers typically is from the order of tens of micrometers. The radiation beam transmissive layer or layers which are present between the radiation beam source and the recording stack that is most remote from the substrate are normally called cover layers. When prefabricated sheets are used as transmissive layers extra transmissive adhesive layers are required in order to bond cover layers to each other.

In the DVR disk the variation or unevenness of the thickness of the radiation beam transmissive layers over the radial extension of the disk has to be controlled very carefully in order to minimize the variation in the optical path length for the impinging radiation. Especially the optical quality of the radiation beam at the focal point in the DVR-blue version, which uses a radiation beam with a wavelength substantially equal to 405 nm and an NA substantially equal to 0.85, is relatively sensitive to variations in the thickness of the transmissive layers. The total layer thickness has an optimal value in order to obtain minimum optical spherical aberration of the focused radiation beam on, e.g., the first information recording layer. A deviation, e.g. +/−5 μm, from this optimal thickness already introduces a considerable amount of this kind of aberration. Because of this small range it is important that the average thickness of the transmissive layers is equal to or close to its optimal thickness in order to make optimal use of the tolerances of the system and to have a high yield in manufacturing the medium. Assuming that a thickness error is Gaussian distributed around the nominal setting of the thickness, it is clear that the number of manufactured disks which do not comply with the above specification is minimal when the target setting of the nominal thickness during manufacture is substantially equal to the optimal thickness of the cover layer as in the specification of the DVR disk. The nominal thickness of a single layer cover of the DVR disk is 100 μm when the refractive index of the cover layer is n=1.6. The nominal thickness of the cover layer has to be adjusted when using a different refractive index. Since a change in optimal thickness can exceed more than one micron, it is clear from the point of view of yield that even this small change has to be taken into account.

As described earlier, multi-stack disks, e.g. dual-stack, are used to increase the storage capacity of disks. Those disks require a transmissive spacer layer in between the recording stacks. In the case of the dual recording layer DVR disk the sum of the thickness of the spacer layer and the cover layer is chosen to be 100 μm, e.g. a 20 μm spacer layer and a 80 μm cover layer. From EP-A-1047055 it is known to use a polymer layer such as, for example, a polycarbonate (PC) sheet as light-transmissive cover or spacer layer and adhere such layer to the information storage layer by means of a thin, spin-coated layer of a UV curable liquid resin or a pressure sensitive adhesive (PSA). Because the disk now is built up of more than one radiation beam transmissive layer it becomes even more difficult to manufacture the disk which varies within the above specified range. Hence for such a disk it is even more important to set the nominal thicknesses substantially equal to the optimal nominal thicknesses of the cover and spacer layers of the disk.

In order not to depend on measures for compensation of spherical aberration in an optical drive when playing or recording e.g. a BD disk, the thickness variation of the cover layer of a single recording stack disk should be smaller than +/−2 μm. For e.g. a dual recording stack BD disk that variation relates to the spacer layer and cover layer thickness and should be smaller than +/−1 μm for each layer separately. As said before, this puts even more stringent requirements in the tolerance of each separate layer.

A technique currently used by some manufacturers for producing a spacer layer is DVD-bonding. Firstly, spincoating provides an auxiliary substrate or "stamper", e.g. a PC substrate with guide grooves, with a thin layer non-adhesive to the stamper, which is subsequently cured or solidified with ultraviolet (UV) radiation. Then, this auxiliary substrate or "stamper" is glued to a DVD substrate with known DVD bonding techniques, in which technique the liquid glue is spincoated while present between the two substrates and subsequently cured by exposure to UV radiation. The circumferential variation of the total thickness of the cured non-adhesive layer and glue layer cannot be controlled well and the necessary tolerance, e.g. +/−1 μm, is not met. Furthermore, the spin coating application of the non-adhesive layer introduces a so-called edge bead effect at the edge of the disk. This is a peripherical zone of e.g. a few mm with relatively largely increased layer thickness because of surface tension effects at the edge of the disk. An increase of the layer thickness of larger than 5 μm may occur in this zone. Subsequently the stamper is separated from the non-adhesive layer that remains glued to the second substrate. Further process steps follow to finalize the DVD medium, e.g. the application of further recording stacks and a cover layer.

Another method comprises the application of a "PSA-like" material which is UV-cured after being brought in contact with the first DVD substrate under vacuum. This material is usually supplied as a sheet of foil. Thickness variations achieved with this material may be below +/−2 μm. However due to the high material costs such a process is relatively expensive compared to a spincoating process.

When using a known spin coating process the following problems are encountered. Because the substrate usually contains a center hole the liquid to be solidified is dosed in the form of a circular bead around the center hole. This usually results in a liquid layer which after rotation of the substrate yields a liquid layer which shows a radially increasing layer thickness of 20–30% from inner to outer diameter of the liquid layer. The edge bead at the peripheral zone of the substrate may result in an extra layer thickness increase of more than 5 μm, e.g. from radius 55 to 58 mm when using a 120 mm diameter circular substrate. Usually these edge phenomena are not uniformly present around the periphery resulting in additional circumferential variations at the outer periphery area of the substrate. When using spin coating with e.g. the DVD-bonding technique glue which is expelled from between the DVD substrate and the stamper may accumulate at the periphery and leave a residue at the stamper or a burr at the DVD substrate after separating these two. This poses a problem for reuse of the stamper and the burr at the edge of DVD substrate may cause problems in subsequent process steps of manufacture of the optical storage medium e.g. application of a transparent cover layer.

It is an object of the invention to provide a method of the kind described in the opening paragraph, for manufacturing an optical storage medium with a spacer layer or cover layer which has a variation in thickness smaller than +/−1 μM, measured over the information storage area.

It is another object of the invention to provide an optical storage medium with a spacer layer made according to the method of the invention containing embossed information.

The first object is achieved with a method according to the opening paragraph which is characterized in that:
the solidification of the liquid layer at ri takes place at a moment in time defined as $t=t_i$,
the solidification of the liquid layer at $r_o$ takes place at a moment in time defined as $t=t_o$ and $t_o=t_i+\delta$ and $\delta>1$ s,
the solidification of the liquid layer between $r_i$ and $r_o$ takes place at a moment in time between $t_i$ and $t_o$.

When using this method the thickness of unsolidified areas, i.e. at radii larger than the radius at which the solidification already has taken place, can still vary, whereas the thickness of already exposed areas is substantially fixed. Varying may be achieved by e.g. changing the rotation frequency of the substrate or by changing the rotation period, although these changes are not necessarily required. The fact that no radial outward flow of liquid will occur from already exposed areas may, in itself, be a sufficient condition to achieve the desired effect which is that the radial thickness distribution of the liquid layer after complete substantial solidification does not have a variation of more than +/−1 μm.

In an embodiment the exposure is performed by a localized radiation source projecting radiation onto the substrate in an area with a diameter substantially smaller than $r_o-r_i$, which radiation source gradually moves radially outward during rotation of the substrate. The localized UV source may be an optical fiber with a tip from which UV radiation emanates. The advantage of using a fiber is that a relatively intense and localized source is achieved, which can easily be moved.

In another embodiment the exposure is performed by a radiation source, which projects a larger radiation intensity at $r_i$ than at $r_o$. In this way the solidification of the liquid layer at the inner radius is achieved more rapidly at the outer radius. In practice the radiation source will chosen such that the radiation intensity will gradually decrease from the inner radius to the outer radius. After some time when the desired thickness distribution has been reached the intensity may be increased to a level to obtain complete uniform solidification. Other ways of achieving radiation intensity differences may be thought of: e.g. varying the distance of the radiation source to the substrate during rotation or varying the divergence of a radiation beam during rotation.

In yet another embodiment the exposure is performed by a radiation source combined with a diaphragm with an adjustable opening diameter which opens during rotation of the substrate from a first diameter $d_1$ to a second diameter $d_2$, and $d_2>d_1$, during a time frame larger than δ, whereby the diaphragm is centered with respect to the center of rotation of the rotating substrate and is present between the radiation source and the substrate. This has the advantage that a normal substantial uniform radiation source may be used, which is relatively cheap and easy to implement. The diaphragm must have an opening diameter range which covers the whole relevant diameter range of the optical storage medium e.g. 40–120 mm in case of a dual layer Blu-Ray Disk. Generally spoken, $d_1$ is substantially equal to 2 times $r_i$ and $d_2$ is substantially equal to 2 times $r_o$. The diaphragm preferably is close, e.g. closer than about one third of $r_o-r_i$, to the substrate in order to ensure sufficient shielding from the radiation source.

It is advantageous when a few mm wide outer peripherical zone of the substrate of the optical storage medium is shielded by a mask in order to prevent exposure of the liquid in this zone to radiation. This is only useful when using a localized moving radiation source, e.g. the fiber, or a radiation source, which projects a larger radiation intensity at the most inner radius where liquid is present than at a radius larger than the inner radius. In these cases it cannot be prevented that the outer peripherical zone is exposed to radiation. The embodiment with the adjustable diaphragm already has a shielding function by itself in which case the outer few mm may be shielded by pausing the diaphragm opening at a position just a few mm smaller than $2.r_o$ during a required time frame. After the exposure of the liquid in the exposed portion, the substrate is rotated at a rotation frequency sufficiently high to substantially remove the non exposed liquid in the outer peripherical zone from the substrate. This has the advantage that a possible edge bead in the outer peripherical zone is removed and that no residues of liquid are left at the outer periphery of either the substrate or a stamper which is used with e.g. the DVD bonding technique as described earlier in which case UV curable glue, which is expelled from between the DVD substrate and the stamper and has accumulated at the periphery and leave a residue at the stamper or a burr at the DVD substrate after separating these two, is removed by this process step. In this way a stamper may be used again more easily. Compare the so-called DVD-18 technique, which is used to produce double sided dual layer DVD read only disks where information is transferred by embossing via a stamper substrate, but which technique requires the removal of excess glue in order to enable a good separation of the stamper substrate and the DVD substrate.

It is especially advantageous when the exposure takes place in an atmosphere containing oxygen and at an exposure intensity leaving a few μm top portion of the liquid layer unsolidified by means of oxygen inhibition. In such a way the top portion of the liquid layer is left substantially unsolidified. This enables the embossing of information, e.g. pregrooves or pits or the inverse, in the top portion of the liquid layer. Small relative variations in the thickness of the top portion, e.g. 0.2 μm, may still occur but are negligible compared to the total thickness of the liquid layer after solidification.

The second object is achieved with an optical storage medium as described in the second paragraph which is characterized in that a stamper is pressed into the unsolidified top portion of the liquid layer of a spacer layer manufactured using the method of the invention. Subsequently the top portion is solidified by exposure to radiation. The stamper is separated from the top portion of the completely solidified liquid layer. Further layers, e.g. recording stacks and a cover layer, may be provided for finalization of the optical storage medium. By leaving the top portion of the liquid layer substantially unsolidified information may be embossed without noticeably disturbing the total thickness of the spacer.

In a favorable embodiment the stamper is transparent to UV radiation and the top portion is solidified by UV radiation which is projected through the transparent stamper. A transparent stamper has the advantage of enabling a more direct exposure of the top portion of the liquid layer and that a substrate may be used which is not transparent to UV radiation.

The method of manufacturing the optical storage medium and the optical storage medium according to the invention will be elucidated in greater detail with reference to the accompanying drawings, in which FIG. 1 shows a schematic cross-sectional view of a setup to perform an embodiment of the method according to the invention using a localized UV source in the form of a movable optical fiber. The dimensions are not drawn to scale;

Figure 1:
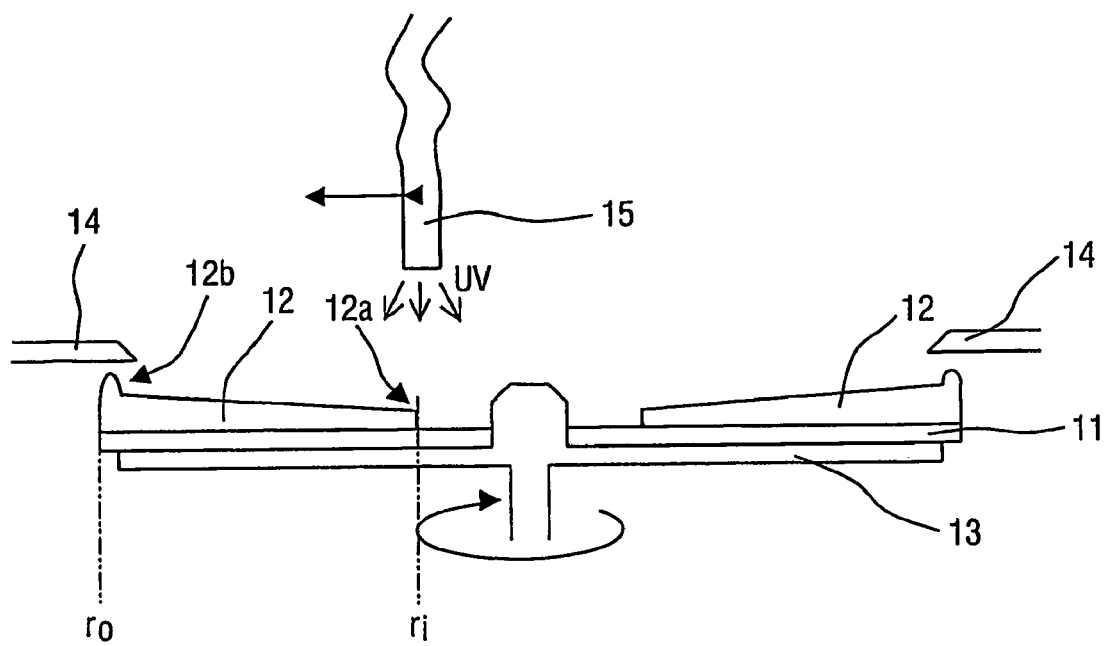

In FIG. 1 a setup for performing an embodiment of the method of manufacturing an optical storage medium is shown. The medium comprises a substrate 11 with a plurality of layers, e.g. a recording stack that is not drawn. A transparent spacer layer 12 is provided by applying a liquid onto the rotating substrate 11 and rotating the substrate 11 further in order to spread out the liquid into a layer 12 substantially uniformly between an inner radius of $r_i$=20 mm and an outer radius of $r_o$=60 mm. The liquid layer 12 is a UV curable lacquer type SD 694 manufactured by DIC having a viscosity of 350 mPas. The rotation frequency of the substrate 11 during solidification is 11 Hz. The substrate 11 is supported by chuck 13. Solidifying the liquid layer 12 is performed by means of exposure to radiation The solidification of the liquid layer 12 is started at $r_i$ at a moment in time defined as $t=t_i$. The solidification of the liquid layer at $r_o$ takes place at a moment in time defined as $t=t_o$ and $t_o=t_i+\delta$ and $\delta$=40 s. The optimal value of δ depends primarily on the process conditions such as UV radiation intensity, radiation curing sensitivity of the lacquer and may be adjusted accordingly. At larger intensities and sensitivities optimal values of δ will generally be shorter.

Values of δ may range between 1 s and several minutes or more, e.g. 1, 2, 4, 5, 10, 15, 20, 25, 30, 40, 60, 90, 120 s.

The solidification of the liquid layer 12 between $r_i$ and $r_o$ takes place at a moment in time between $t_i$ and $t_o$. The exposure is performed by a localized radiation source, in this case an optical fiber 15 source projecting radiation onto the substrate 11 in an area substantially smaller than $r_o-r_i$. The optical fiber source 15 is a Superlite-UV unit made by Lumatech. During rotation of the substrate 11, the optical fiber source 15 gradually moves radially outward with a velocity of 1 mm/s starting at $t=t_i$. The diameter of the UV spot at the substrate 11 is about 10 mm and the UV fiber is positioned at a height of about 20 mm above the substrate 11. The UV intensity is 0.08 W/cm². A few mm outer peripherical zone of the substrate is shielded by a mask 14 in order to prevent exposure of the liquid 12b in this zone to the radiation. After the exposure of the liquid 12 in the exposed portion, the substrate 11 is rotated at a rotation frequency sufficiently high, i.e. 30 Hz, to substantially remove the non exposed liquid 12b in the outer peripherical zone from the substrate 11. The exposure takes place in an atmosphere containing oxygen, i.e. air, and at an exposure intensity leaving a few μm top portion of the liquid layer 12 unsolidified by means of oxygen inhibition. Note that in the drawing the layer thickness of the liquid layer 12 is drawn showing the situation before starting the exposure method according to the invention.

Figure 2:
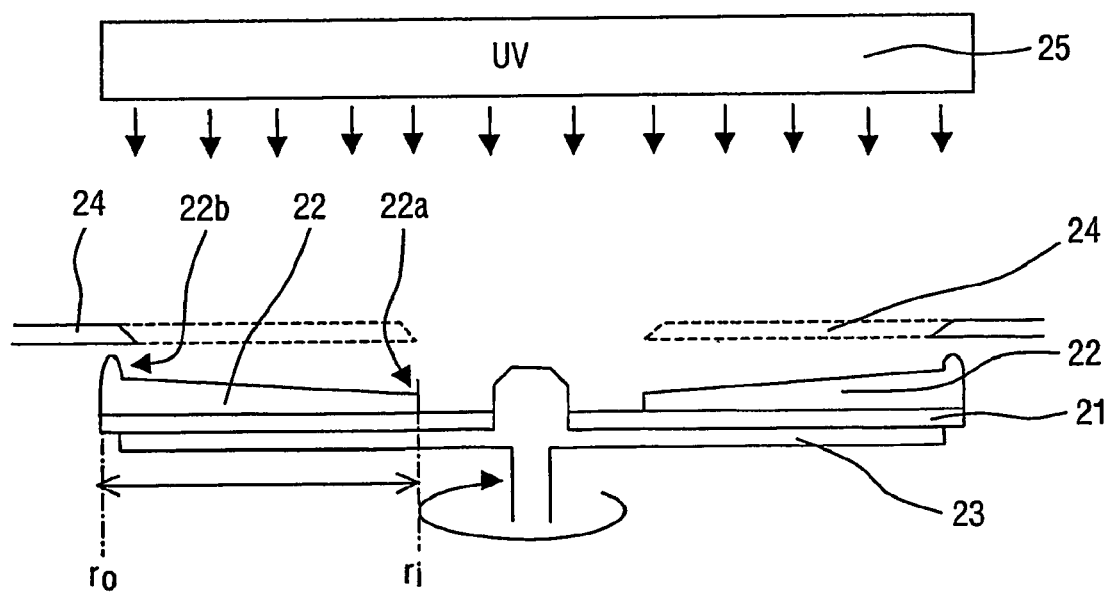
FIG. 2 shows a schematic cross-sectional view of a setup to perform an embodiment of the method according to the invention using an adjustable diaphragm and UV source. The dimensions are not drawn to scale.

In FIG. 2 a setup for performing an embodiment of the method of manufacturing an optical storage medium is shown. The medium comprises a substrate 21 with a plurality of layers, e.g. a recording stack, which is not drawn.

A transparent spacer layer 22 is provided by applying a liquid 22 onto the rotating substrate 21 and rotating the substrate 21 further in order to spread out the liquid 22 substantially uniformly between an inner radius of $r_i$=20 mm and an outer radius of $r_o$=60 mm. The liquid is a UV curable lacquer type SD 694 manufactured by DIC having a viscosity of 350 mPas. The rotation frequency of the substrate during solidification is 11 Hz. Solidifying the liquid 12 is performed by means of exposure to radiation. The solidification of the liquid is started at $r_i$ at a moment in time defined as $t=t_i$, The solidification of the liquid at $r_o$ takes place at a moment in time defined as $t=t_o$ and $t_o=t_i+\delta$ and $\delta=20$ s. The solidification of the liquid 22 between $r_i$ and $r_o$ takes place at a moment in time between $t_i$ and $t_o$. The exposure is performed by a UV radiation source 25, in this case a high power UV source (Philips HP-A 400W) with a special reflector at a height of 18 cm above the liquid 22 surface. UV radiation source 25 gives a substantially uniform radiation output. The UV intensity at the position of the liquid layer 12 of the substrate is 0.16 W/cm². A diaphragm 24 with an adjustable opening diameter opens during rotation of the substrate 21 from a first diameter of 40 mm to a second diameter of 120 mm. The opening velocity is 2.0 mm/s. The diaphragm 24 is centered with respect to the center of rotation of the rotating substrate 21. The diaphragm 24 is present between the UV radiation source 25 and the substrate 21 at a height above the substrate 21 of about 5 mm. At the end of the exposure interval the few mm outer peripherical zone of the substrate 21 is still shielded by the diaphragm 24, which is paused in order to prevent exposure of the liquid 22b in this zone to radiation. After the exposure of the liquid 22 in the exposed portion, the substrate 21 is rotated at a rotation frequency sufficiently high, i.e. 30 Hz, to substantially remove the non exposed liquid 22b in the shape of an edge bead in the outer peripherical zone from the substrate 21. The exposure takes place in an atmosphere containing oxygen, i.e. air, and at an exposure intensity leaving a few µm top portion of the liquid layer 22 unsolidified by means of oxygen inhibition. Note that in the drawing the layer thickness of the liquid layer 22 is drawn showing the situation before starting the exposure method according to the invention.

Figure 3:
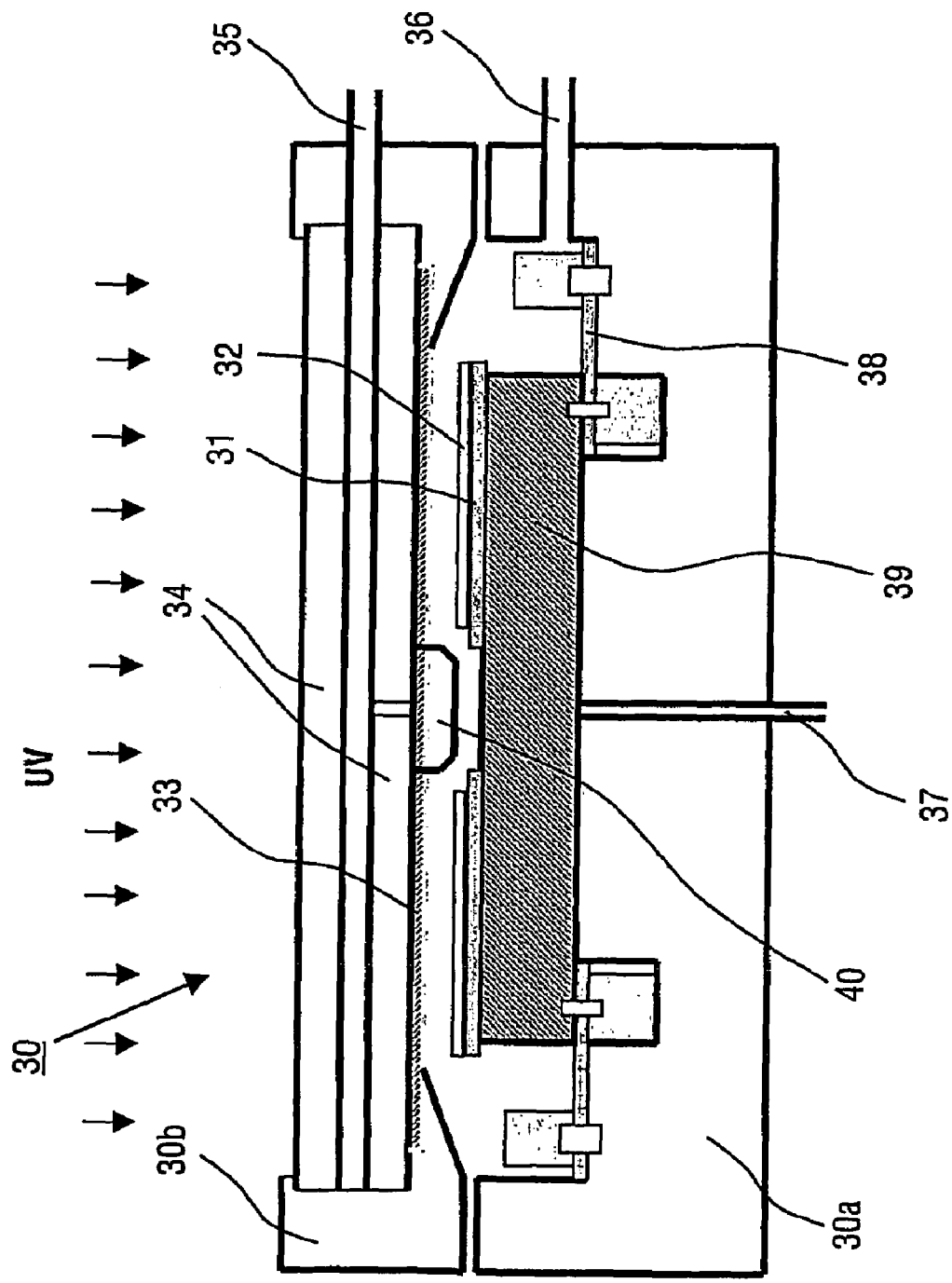
FIG. 3 shows a device in which an optical storage medium manufactured with the method according to the invention is present and embossed with a transparent stamper.

In FIG. 3 a device 30 is shown to manufacture an optical storage medium, e.g. containing two or more recording stacks separated by spacer layers. A stamper 33 transparent to UV radiation is pressed into the unsolidified top portion of the precured liquid layer 32 manufactured according to the method of the invention. Subsequently the top portion is solidified by exposure to UV radiation which is projected through the transparent stamper 33. The transparent stamper 33 is separated from the top portion of the completely solidified liquid layer 32. Further layers are provided separately for finalization of the optical storage medium. Note that a non-transparent stamper, e.g. Ni, may be used in case exposure of the liquid layer 32 is performed from a side other than the side where the stamper is present.

The functioning of device 30 for manufacture of a medium will now be explained in more detail. The substrate 31, provided with a liquid layer 32 according to the method of the invention is positioned on top of a holder 39 in the bottom part 30a of the device and at the same time precentered. The holder 39 is connected to the rest of the bottom part 30a of the device by means of a rubber membrane 38. At the beginning of the process, vacuum is present under the holder 39 of the bottom part 30a. The top part 30b of the device 30, holds a transparent stamper 33 which is held in position against the top part 30b by means of a vacuum outlet 35. The centering pin 40 around which the stamper 33 is centered is tapered and will center the substrate 31 with precured liquid layer 32 when parts 30a and 30b are brought together. Air between the substrate 31 and stamper 33 is pumped out through opening 36 until a desired underpressure level is achieved. Subsequently air is let into the bottom part 31a through opening 37, which action presses the substrate 31 with layer 32 against the stamper 33. UV radiation is sent through the transparent plates 34 and the transparent stamper 33 in a desired dose and cures the top portion of the layer 32. Air is released back into through 36 and after opening the device 30 the stamper may be separated from the substrate 31 with cured layer 32. The top surface of cured layer 32 now contains a negative copy of the relief structure of the stamper 33.

According to the invention a method of producing an optical storage medium for recording, such as e.g. DVR-blue, and a medium manufactured using said method is provided. An optical storage medium, comprising a substrate and a plurality of layers deposited on the substrate includes at least a transparent spacer layer or transparent cover layer. This layer is provided by applying a liquid onto the rotating substrate and rotating the substrate further in order to spread out the liquid substantially uniformly between an inner radius ri and an outer radius $r_o$. The liquid is solidifying by means of exposure to radiation and the solidification of the liquid is started at ri at a moment in time defined as $t=t_i$, The solidification of the liquid at $r_o$ takes place at a moment in time defined as $t=t_o$ and $t_o=t_i+\delta$ and $\delta>1$ s. In this manner a thickness uniformity of the spacer or cover layer is achieved with a variation smaller than +/−1 µm. Further an optical storage medium is provided with a spacer layer manufactured using the method of the invention containing embossed information from a stamper.

The invention claimed is:

1. A method of manufacturing an optical storage medium, comprising a substrate and a plurality of layers deposited on the substrate, including at least one of a transparent spacer layer and transparent cover layer, which layer is provided by applying a liquid onto the rotating substrate and rotating the substrate further in order to spread out the liquid into a layer substantially uniformly between an inner radius $r_i$ and an outer radius $r_o$, and substantially solidifying the liquid layer by means of exposure to radiation characterized in that:
   the solidification of the liquid layer at $r_i$ takes place at a moment in time defined as $t=t_i$,
   the solidification of the liquid layer at $r_o$ takes place at a moment in time defined as $t=t_o$ and $t_o=t_i+\delta$ and $\delta>1$ s,
   the solidification of the liquid layer between $r_i$ and $r_o$ takes place at a moment in time between $t_i$ and $t_o$.

2. A method as claimed in claim 1, wherein the radiation is UV radiation.

3. A method as claimed in claim 1, wherein the exposure is performed by a localized radiation source projecting radiation onto the substrate in an area with a diameter substantially smaller than $r_o-r_i$, which radiation source gradually moves radially outward during rotation of the substrate.

4. A method as claimed in claim 3, wherein the localized radiation source is an optical fiber.

5. A method as claimed in claim 1, wherein the exposure is performed by a radiation source, which projects a larger radiation intensity at $r_i$ than at $r_o$.

6. A method as claimed in claim 1, wherein the exposure is performed by a radiation source combined with a diaphragm with an adjustable opening diameter which opens during rotation of the substrate from a first diameter $d_1$ to a second diameter $d_2$, and $d_2>d_1$, during a time frame larger than δ, whereby the diaphragm is centered with respect to the center of rotation of the rotating substrate and present between the radiation source and the substrate.

7. A method a claimed in claim 6, wherein $d_1$ is substantially equal to 2 times $r_i$ and $d_2$ is substantially equal to 2 times $r_o$.

8. A method as claimed in claim 1, wherein a few mm wide outer peripherical zone of the substrate is shielded by a mask in order to prevent exposure of the liquid layer in this zone to radiation.

9. A method as claimed in claim 6, wherein after the exposure of the liquid layer in the exposed portion, the substrate is rotated at a rotation frequency sufficiently high to substantially remove the non exposed liquid in the outer peripherical zone from the substrate.

10. A method as claimed in claim 1, wherein the exposure takes place in an atmosphere containing oxygen and at an exposure intensity leaving a few μm top portion of the liquid layer unsolidified by means of oxygen inhibition.

11. An optical storage medium manufactured using the method of claim 10, wherein additionally:
- a stamper is pressed into the unsolidified top portion of the liquid layer,
- subsequently the top portion is solidified by exposure to radiation,
- the stamper is separated from the top portion of the completely solidified liquid layer,
- further layers are provided for finalization of the optical storage medium.

12. An optical storage medium according to claim 11, wherein the stamper is transparent to UV radiation and the top portion is solidified by UV radiation which is projected through the transparent stamper.

* * * * *